United States Patent
Cook et al.

(10) Patent No.: US 7,889,523 B2
(45) Date of Patent: Feb. 15, 2011

(54) VARIABLE LOAD, VARIABLE OUTPUT CHARGE-BASED VOLTAGE MULTIPLIERS

(75) Inventors: Thomas D. Cook, Austin, TX (US); Tahmina Akhter, Austin, TX (US); Jeffrey C. Cunningham, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 732 days.

(21) Appl. No.: 11/870,259

(22) Filed: Oct. 10, 2007

(65) Prior Publication Data

US 2009/0097285 A1    Apr. 16, 2009

(51) Int. Cl.
H02M 3/28 (2006.01)
H02M 7/00 (2006.01)

(52) U.S. Cl. .................... 363/59; 327/536; 363/124

(58) Field of Classification Search ......... 327/534–537; 363/59, 60, 124
See application file for complete search history.

(56) References Cited

U.S. PATENT DOCUMENTS

| | | | |
|---|---|---|---|
| 4,405,868 A | 9/1983 | Lockwood | |
| 4,559,548 A | 12/1985 | Iizuka et al. | |
| 4,636,930 A | 1/1987 | Bingham et al. | |
| 4,752,699 A | 6/1988 | Cranford, Jr. et al. | |
| 4,807,104 A | 2/1989 | Floyd et al. | |
| 4,888,677 A | 12/1989 | Grimm et al. | |
| 4,935,644 A | 6/1990 | Tsujimoto | |
| 5,008,799 A | 4/1991 | Montalvo | |
| 5,216,588 A | 6/1993 | Bajwa et al. | |
| 5,685,011 A | 11/1997 | Rosenthal et al. | |
| 5,732,039 A | 3/1998 | Javanifard et al. | |
| 5,781,473 A | 7/1998 | Javanifard et al. | |
| 6,198,342 B1 * | 3/2001 | Kawai | 327/536 |
| 6,370,075 B1 | 4/2002 | Haeberli et al. | |
| 7,279,959 B1 * | 10/2007 | Choy | 327/536 |
| 7,579,902 B2 * | 8/2009 | Frulio et al. | 327/536 |
| 2007/0069801 A1 | 3/2007 | Ragone et al. | |

* cited by examiner

*Primary Examiner*—Jessica Han
(74) *Attorney, Agent, or Firm*—Kim-Marie Vo; Charles Bergere

(57) ABSTRACT

A charge-based voltage multiplier device comprising a charge-pump circuit and a charge-pump controller is provided. The charge-pump circuit is configured to multiply an input voltage signal ($V_{in}$) into an output voltage signal ($V_{out}$), the charge-pump circuit includes a plurality of charge-pump stages, wherein at least one of the charge-pump stages includes a weighted capacitor array of pump cells. The charge-pump controller is configured to provide a pump cell select to selectively control the weighted capacitor array of pump cells of the at least one of the charge-pump stages of the charge-pump circuit.

18 Claims, 4 Drawing Sheets

VARIABLE LOAD, VARIABLE OUTPUT CHARGE-BASED VOLTAGE MULTIPLIERS

BACKGROUND

1. Field

This disclosure relates generally to voltage multipliers, and more specifically, to variable load, variable output charge-based voltage multipliers.

2. Related Art

Traditional voltage multipliers suffer from several drawbacks. For example, traditional voltage multipliers are limited to a narrow range of output voltages and loads. This is because a voltage multiplier is typically required to satisfy certain performance requirements. Traditional voltage multipliers when used to obtain a broader range of output voltages and loads fail to meet these performance requirements. One of the performance requirements for a voltage multiplier relates to a ripple factor that the output of the voltage multiplier needs to satisfy. Traditional voltage multipliers stop the clock when the output voltage is greater than the regulation voltage and then depend on the load to depress the output voltage. This method of generating a regulated voltage suffers from excessive ripple.

Additionally, in traditional voltage multipliers, the ripple present in the output of the voltage multiplier can vary based on the output voltage that the voltage multiplier is required to supply. This is because to vary the output voltage, typically, a multi-stage voltage multiplier is used in which the number of stages can be varied to change the output voltage. However, if the number of stages is increased to accommodate the load, the ripple also increases.

Accordingly, there is a need for charge-based voltage multipliers that can handle variable load and provide various output voltages without a concomitant increase in the ripple.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

A variable load, variable output charge-based voltage multiplier includes the ability to support a variety of loads and output voltages while suppressing ripple. By way of example, a pump block controlled by a pump control block provide the ability to vary load and output voltage using one design.

In one aspect, a charge-based voltage multiplier device is provided. The charge-based voltage multiplier device includes a charge-pump circuit configured to multiply an input voltage signal into an output voltage signal, the charge-pump circuit includes a plurality of charge-pump stages, wherein at least one of the charge-pump stages includes a weighted capacitor array of pump cells. The charge-based voltage multiplier device further includes a charge-pump controller configured to provide a pump cell select to selectively control the weighted capacitor array of pump cells of the at least one of the charge-pump stages of the charge-pump circuit.

In another aspect, a charge-based voltage multiplier device is provided. The charge-based voltage multiplier device includes a charge-pump circuit configured to multiply an input voltage signal into an output voltage signal, the charge-pump circuit includes a plurality of charge-pump stages, wherein at least one of the charge-pump stages includes a weighted capacitor array of pump cells, wherein the weighted capacitor array of pump cells comprises a binary weighted capacitor array of pump cells. The charge-based voltage multiplier device further includes a charge-pump controller configured to provide a pump cell select to selectively control the weighted capacitor array of pump cells of the at least one of the charge-pump stages of the charge-pump circuit. The charge-pump controller further comprises: (1) means for sensing transition changes in a comparison of the charge-pump circuit voltage output and a reference voltage; (2) means for counting a number of clock periods occurring after each sensed transition; and (3) means for incrementing or decrementing the source impedance of the charge-pump circuit, as a function of the counted number of clock periods occurring after each sensed transition, by selectively clocking the weighted capacitor array of pump cells of the charge-pump stages to decrease or increase, respectively, a corresponding capacitance of the respective charge-pump stages.

In yet another aspect, a method for multiplying a charge-based voltage is provided. The method includes configuring a charge-pump circuit to multiply an input voltage signal into an output voltage signal, the charge-pump circuit includes a plurality of charge-pump stages, wherein at least one of the charge-pump stages includes a weighted capacitor array of pump cells. The method further includes configuring a charge-pump controller to provide a pump cell select to selectively control the weighted capacitor array of pump cells of the at least one of the charge-pump stages of the charge-pump circuit.

Figure 1:
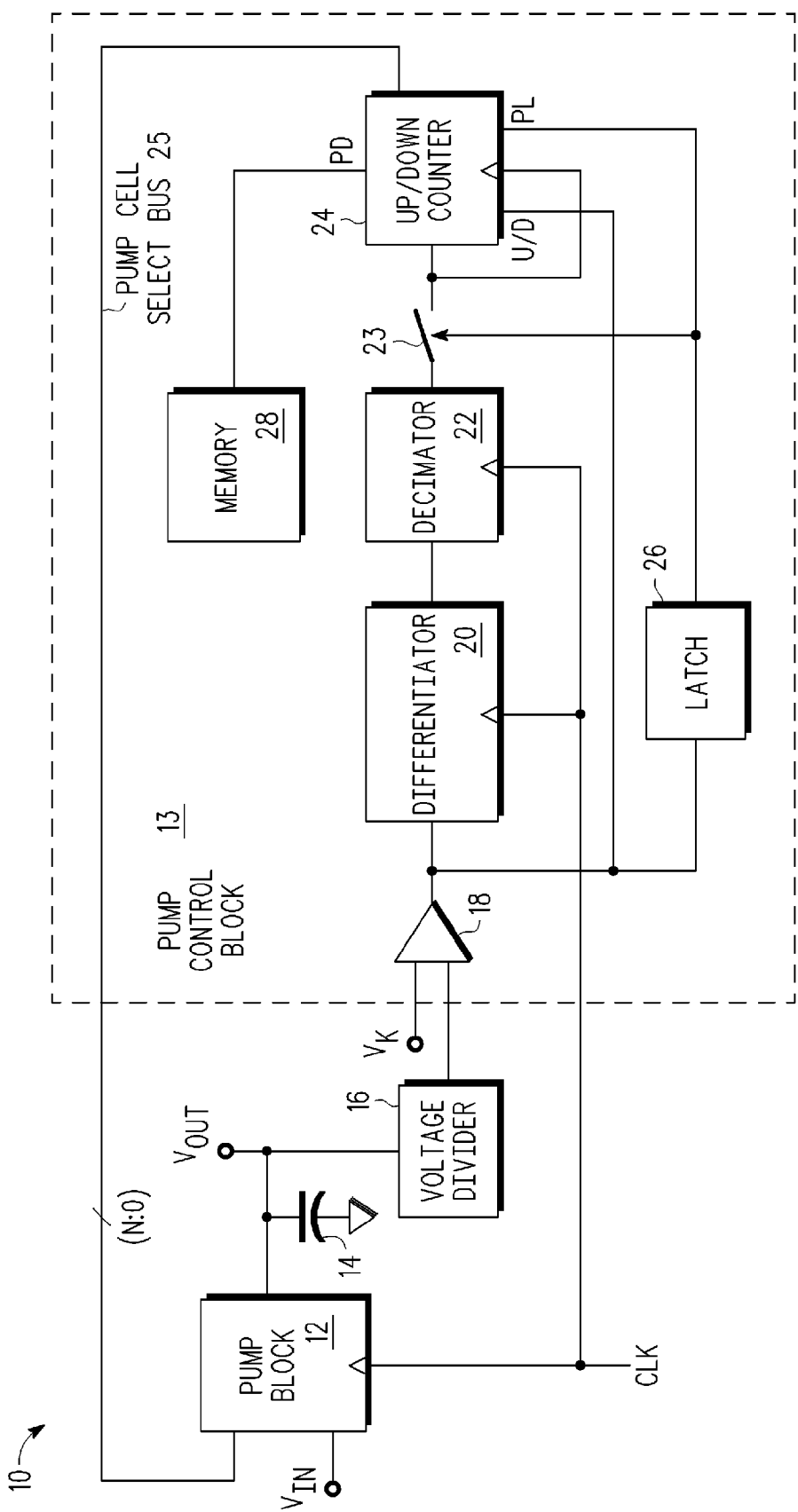
FIG. 1 is a block diagram of an exemplary charge-based voltage multiplier.

FIG. 1 is a block diagram of an exemplary charge-based voltage multiplier 10. Charge-based voltage multiplier 10 may receive a voltage input ($V_{in}$) and provide a regulated voltage as an output voltage ($V_{out}$). Charge-based voltage multiplier 10 may further receive a clock signal CLK. Charge-based voltage multiplier 10 may include a pump block 12 and a pump control block 13, a stability capacitor 14, a voltage divider 16, and a comparator 18. Pump control block 13 may control an impedance of pump block 12. Pump control block 13 may include a differentiator 20, a decimator 22, an up/down counter 24, a latch 26, and a memory 28. By way of example, at its core, charge-based voltage multiplier 10 may operate consistent with the principles of charge accumulation and charge transfer. During the accumulation step, a charge may be deposited on a capacitor (provided as part of pump block 12, for example) and during the transfer step, charge could be moved from the capacitor to another capacitor or to the load connected to receive the output voltage, for example. Stability capacitor 14 provides a reservoir of charge in the absence of a capacitive load. Pump control block 13 may provide a control input via pump cell select bus 25 to pump block 12. By way of example, the control input may be used to enable or disable pump cells contained within a pump stage of pump block 12. For example, in one embodiment, N bits may be used to enable or disable any of the N pump cells located within in a pump stage. To accomplish selective use of pump cells any mechanism may be used to selectively enable/disable pump cells. By way of example, shown in FIG. 1 is differentiator 20 that monitors the output of comparator 18 and produces a pulse each time the comparator changes state. The pulses from differentiator 20 reset decimator 22. Decimator 22 may be coupled to up/down counter 24 via switch 23. Switch 23 may be closed or opened based on a switch control input, which may be received from latch 26. By way of example, when switch 23 is closed after several clocks decimator 22 generates a rising edge that causes up/down counter 24 to increment or decrement based on the comparator output. The initial ramp speed of charge-based voltage multiplier 10 can be independently controlled via latch 26 and switch 23 between decimator 22 and up/down counter 24. In sum, pump control block 13 tallies a number of clock periods of a clock signal for which the output voltage of pump block 12 is above or below a reference voltage and outputs a pump cell select signal as a function of the tallied number of clock periods for which the output voltage is above or below the reference voltage. By doing so, pump control block 13 adjusts the capacitance of corresponding pump stages (discussed below with respect to FIG. 2) to affect the output impedance of pump block 12.

Before starting charge-based voltage multiplier 10 or in response to a reset signal, a value may be loaded into up/down counter 24 from memory 28. Since up/down counter 24 is initially disabled, this value is used by pump block 12 until the first transition of comparator 18 changes a state of latch 26 and triggers a parallel load of up/down counter 24. In particular, a change in the value of latch opens or closes switch 23. By way of example, parallel load of up/down counter 24 may be accomplished by loading a value stored in memory 28 into up/down counter 24 via parallel down (PD) bus. Once the state of latch 26 is changed, decimator 22 is used to clock up/down counter 24 ensuring that charge-based voltage multiplier 10 will automatically adjust for changes in the load voltage and/or in the reference voltage, while minimizing ripple. Although FIG. 1 shows a specific number of components arranged in a specific manner, alternate embodiments of charge-based voltage multiplier 10 may include fewer or additional components, which may be arranged differently. For example, although FIG. 1 shows a specific embodiment including a differentiator, a decimator, and an up/down counter, any mechanism to sense changes in the comparator output, any mechanism to count the clocks after a transition in an output of the comparator, and any mechanism to increment or decrement the impedance of pump block 12 may be used.

Figure 2:
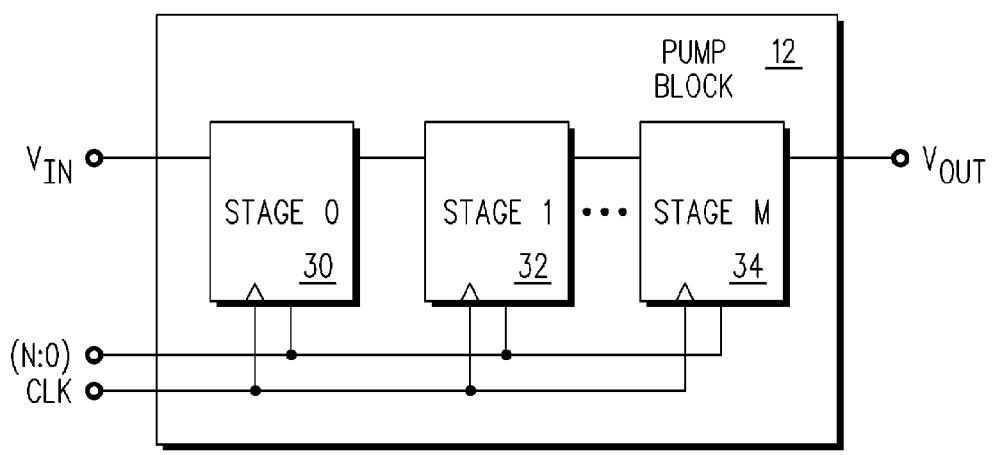
FIG. 2 is a block diagram of an exemplary pump block for the exemplary charge-based voltage multiplier shown in FIG. 1.

FIG. 2 is a block diagram of an exemplary pump block 12 for the exemplary charge-based voltage multiplier shown in FIG. 1. By way of example, pump block 12 may include several pump stages: stage 0 30, stage 1 32, and stage M 34. Stage 0 30 may receive the input voltage ($V_{in}$) and stage M 34 may provide the regulated output voltage ($V_{out}$). The output voltage of stage 0 30 may be provided an input voltage to stage 1 32 and so on and so forth. Thus, for example, stage M 34 may receive as input the output voltage of stage M-1 (not shown). Each stage may further receive the clock signal CLK and a control input (N:0) from pump control block 13. The control input from pump control block 13 may be used to selectively enable/disable pump cells located within each pump stage. Although FIG. 2 shows the same control input as being coupled to each of the pump stages, different control inputs may be coupled to different pump stages. Thus, stage 0 30 may receive one set of control inputs and stage 1 32 may receive a different set of control inputs. In this manner, pump cells located within stage 0 30 and stage 1 32 may be independently enabled and/or disabled.

Figure 3:
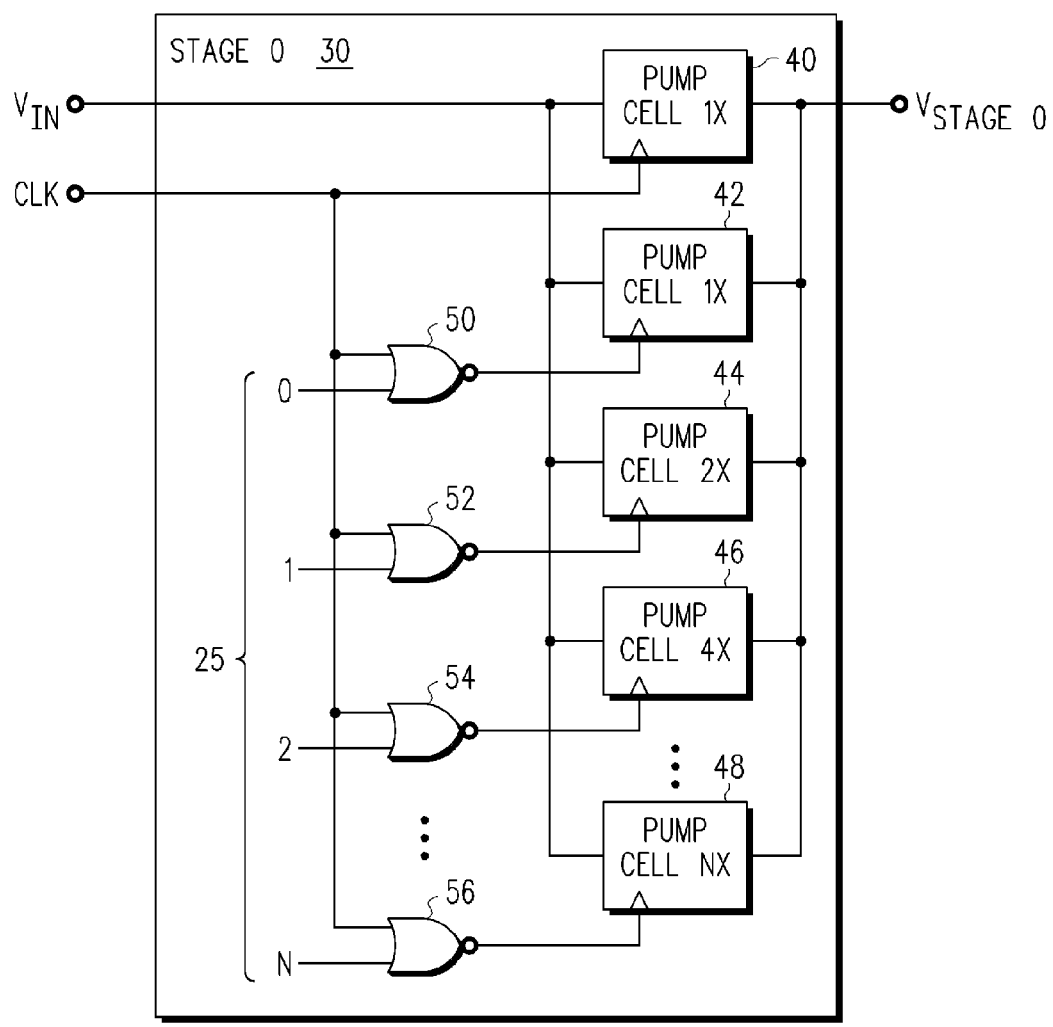
FIG. 3 is a block diagram of a pump stage of the exemplary pump block shown in FIG. 2.

FIG. 3 is a block diagram of pump stage 30 of the exemplary pump block shown in FIG. 2. Pump stage 30 may be any of the pump stages shown in FIG. 2. Pump stage 30 may include at least two or more pump cells and corresponding logic. In one example, pump stage 30 may include a weighted capacitor array of pump cells. By way of example, pump stage 30 may include pump cell 1x 40, pump cell 1x 42, pump cell 2x 44, pump cell 4x 46, and pump cell Nx 48. Pump cells 44, 46, and 48 may include two times, four times, and N times the number of capacitors in pump cells 40 and 42, respectively. Thus, for example, if pump cell 1x 40 includes a single capacitor, pump cell 2x 44 may include two capacitors, pump cell 4x may include four capacitors, and pump cell Nx may include N capacitors. Although FIG. 3 discusses capacitors with an even number multiplier, an odd number multiplier may also be used. Each pump cell is clocked only when the control signal (pump select signal) corresponding to the pump cell is low. Thus, pump stage 0 has a maximum impedance when all control signals are high and only pump cell 1x 40 is clocked and pump stage 0 has a minimum impedance when all control signals are low and all pump cells 40, 42, 44, 46, and 48 are clocked. By way of example, in one embodiment, NOR gates 50, 52, 54, and 56 may be used with respective control input (N:0) from pump control block 13 as one input and the clock (CLK) as the other input. The output of stage 0 30 labeled as $V_{stage\ 0}$ may be provided as an input to stage 1 32 of FIG. 2. Pump stages 30, 32, and 34 may generate positive or negative voltages. In one embodiment, pump stages 30, 32, and 34 may be coupled in series.

Figure 4:
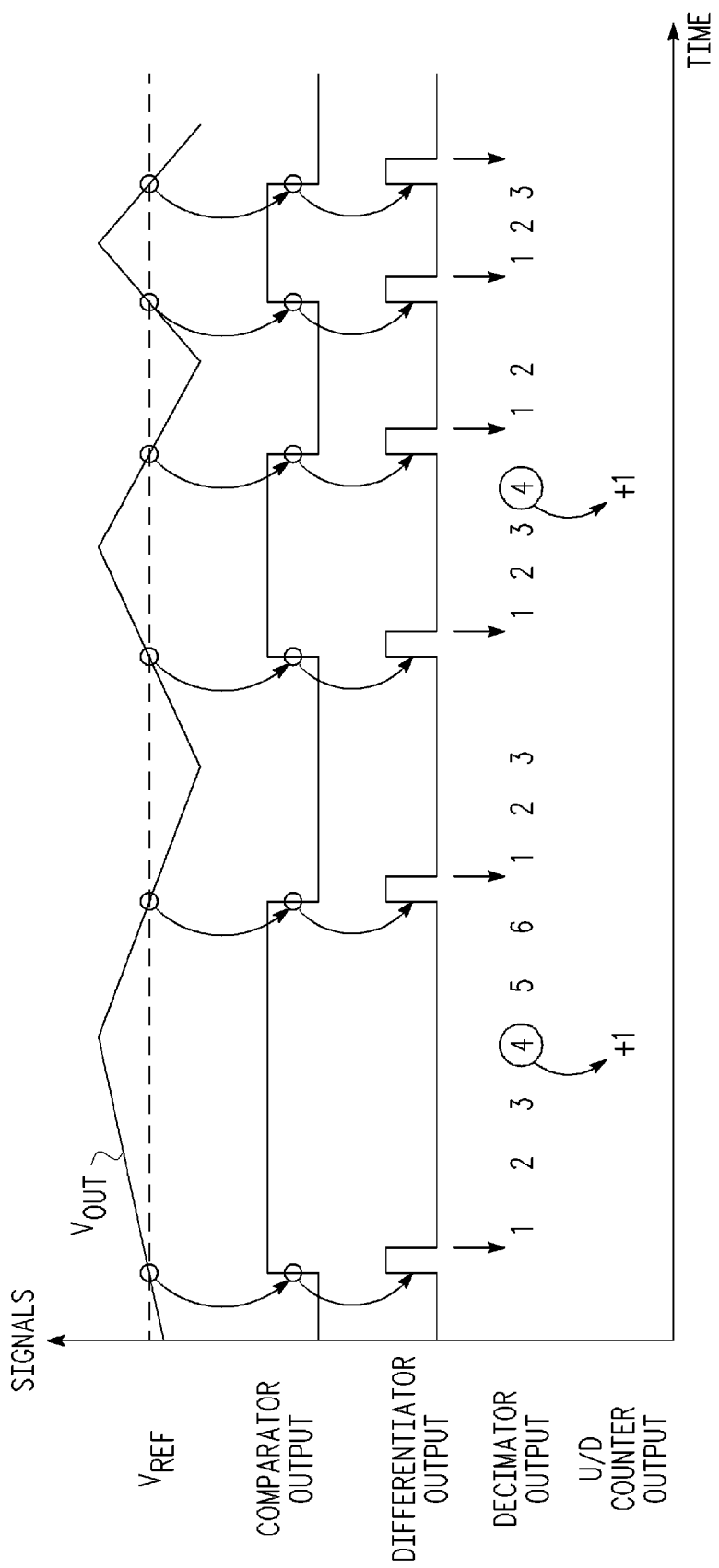
FIG. 4 is a diagram illustrating exemplary relationship among the various signals related to the exemplary charge-based voltage multiplier shown in FIG. 1.

FIG. 4 is a diagram illustrating exemplary relationship among the various signals related to exemplary charge-based voltage multiplier 10 shown in FIG. 1. In particular, FIG. 4 shows a relationship among the reference voltage ($V_{ref}$), the output voltage ($V_{out}$), the comparator output, the differentiator output, the decimator output, and the up/down counter input. When the output voltage ($V_{out}$) goes above the reference voltage ($V_{ref}$), the comparator output (output of comparator 18 of FIG. 1) goes up. In response to the comparator output going up, differentiator 20 outputs a pulse. Decimator 22 outputs a signal after the elapse of a predetermined number of clocks since the pulse generated by differentiator 20. By way of example, FIG. 4 shows decimator 22 outputting a signal after every four clocks. When switch 23 is closed, up/down counter 24 is incremented in response to the signal from decimator 22. An increase in the counter value, results in additional impedance being added to pump block 12 because of an additional pump cell being selected as part of pump stage 0, for example. As the output voltage ($V_{out}$) goes below the reference voltage ($V_{ref}$), the comparator output goes down. In response to the comparator output going down, differentiator 20 outputs a pulse. Decimator 22 does not output a signal this time because in the example shown in FIG. 4, the output voltage ($V_{out}$) starts to go up before decimator 22 can output the signal. As the output voltage ($V_{out}$) goes above the reference voltage ($V_{ref}$), the comparator output (output of comparator 18 of FIG. 1) goes up. In response to the comparator output going up, differentiator 20 outputs a pulse. Decimator 22 outputs a signal to up/down counter 24 after the elapse of four clocks, which further results in up/down counter 24 being incremented. The incrementing and decrementing of up/down counter 24 results in automatic adjustment of the impedance of pump block 12. When the output voltage ($V_{out}$) is less than the reference voltage ($V_{ref}$), the impedance of pump block 12 is too high and should be decreased. On the other hand, when the output voltage ($V_{out}$) is greater than the reference voltage ($V_{ref}$), the impedance of pump block 12 is too low and should be increased. In sum, charge-based voltage multiplier 10 includes a mechanism to sense changes in the comparator output, a mechanism to count the clocks after a transition in an output of the comparator, and a mechanism to increment or decrement the impedance of pump block 12 by selectively clocking pump cells provided as part of pump block 12. The dynamic adjustment of impedance results in lower ripple than conventional voltage multipliers. In other words, comparator 18 and differentiator 20 sense transition changes in a comparison of the charge-pump circuit voltage output and the reference voltage. Decimator 22 counts the number of clock periods that occur after every sensed transition and up/down counter 24 increments or decrements the source impedance of pump block 12 as a function of the counted number of clock periods that occur after each sensed transition by selectively clocking the weighted capacitor array of pump cells of charge pump stages (30, 32, and 34, for example) to decrease or increase, respectively, a corresponding capacitance of the respective charge pump stages.

Figure 5:
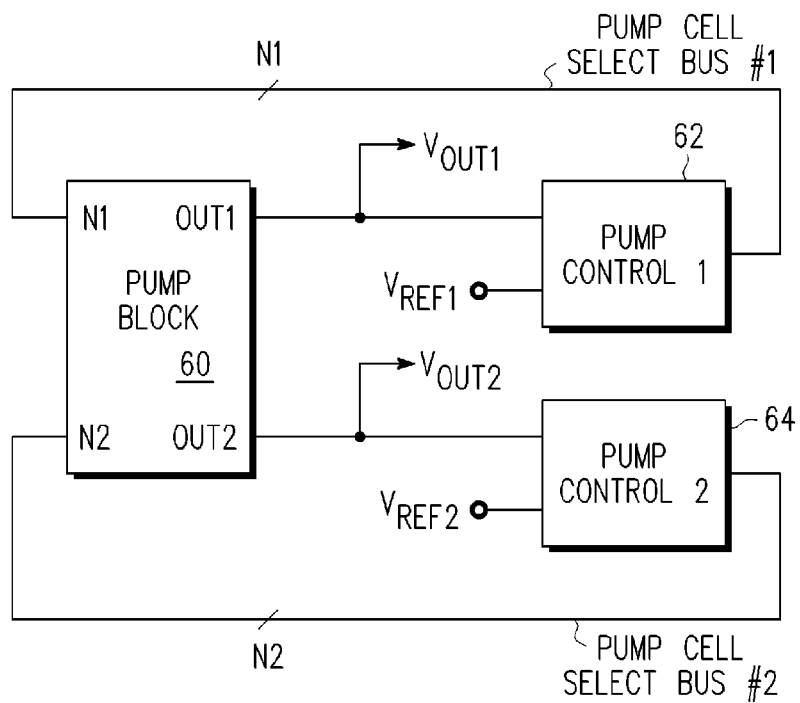
FIG. 5 is a block diagram of an alternative embodiment of a charge-based voltage multiplier.

FIG. 5 is a block diagram of an alternative embodiment of charge-based voltage multiplier 10. The embodiment shown in FIG. 5 may be used to obtain two different output voltages from charge-based voltage multiplier 10. Each one of the output voltages may be controlled independent of each other to obtain desired output voltage and performance requirements. By way of example, the embodiment of charge-based voltage multiplier 10 shown in FIG. 5 may include a pump block 60 coupled to two separate pump control blocks: pump control 1 62 and pump control 2 64. Each pump control block may be implemented in the same manner as pump control block 13 described above. Pump control 1 62 may provide control signals N1 and pump control 2 64 may provide control signals N2. Control signals N1 may be provided via pump cell select bus #1 and control signals N2 may be provided via pump cell select bus #2. By using two different reference voltages ($V_{ref1}$ and $V_{ref2}$) and two different pump control blocks, however, two different regulated voltage outputs ($V_{out1}$ and $V_{out2}$) may be obtained. Consistent with the description of FIG. 1, each pump control block may include any mechanism to sense changes in the comparator output, any mechanism to count the clocks after a transition in an output of the comparator, and any mechanism to increment or decrement the impedance of relevant pump cells of the pump block. Although FIG. 5 shows only two different pump control blocks, additional pump control blocks may also be used, if necessary.

Figure 6:
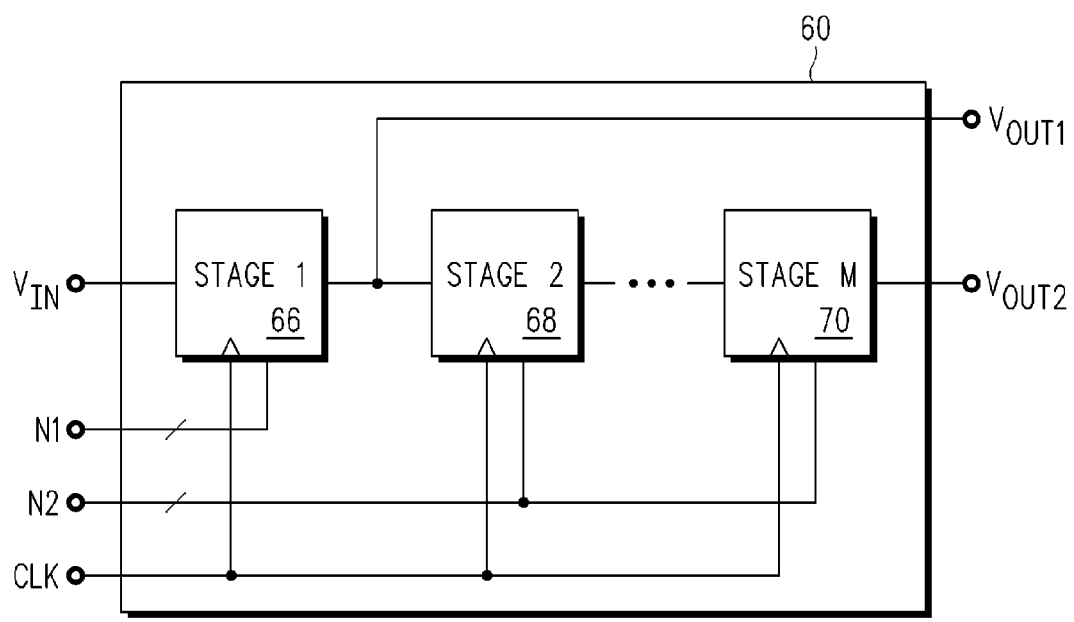
FIG. 6 is a block diagram of an exemplary pump block of the charge-based voltage multiplier shown in FIG. 5.

FIG. 6 is a block diagram of an exemplary pump block of the charge-based voltage multiplier shown in FIG. 5. Like the pump block shown in FIG. 2, pump block 60 may include multiple pump stages: stage 1 66, stage 2 68, and stage M 70. By way of example, N1 control signals may be used to control stage 1 66 and N2 control signals may be used to control stage 2 68 and stage M 70. Voltage output $V_{out1}$ may be obtained at the output of stage 1 66 and voltage output $V_{out\ 2}$ may be obtained at the output of stage M 70. By using two different pump control stages coupled to a single pump block, two different output voltages with low ripple despite varying load may be obtained. Although FIG. 6 shows only two output voltages, additional output voltages may also be obtained.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A device comprising:
   a charge-pump circuit configured to multiply an input voltage signal into an output voltage signal, the charge-pump circuit including a plurality of charge-pump stages, wherein at least one of the plurality of charge-pump stages includes a weighted capacitor array of pump cells; and
   a charge-pump controller configured to provide a pump cell select to selectively control the weighted capacitor array of pump cells of the at least one of the plurality of charge-pump stages of the charge-pump circuit,
   wherein the charge-pump controller tallies a number of clock periods of a clock for which the voltage output is above or below the reference voltage and outputs a pump cell select as a function of the tallied number of clock periods for which the voltage output is above or below the reference voltage and thereby adjusts the capacitance of corresponding charge-pump stages to affect a corresponding change in output impedance of the charge-pump circuit.

2. The device of claim 1, wherein the plurality of charge-pump stages are coupled in series.

3. The device of claim 2, wherein the charge-pump circuit further includes a voltage input, a clock input, a pump cell select input and a voltage output, and
   wherein at least one of the plurality of charge-pump stages includes a stage voltage input, a stage clock input, a pump cell select input, and a stage voltage output, and
   wherein (i) the clock input couples to the stage clock input of the plurality of charge-pump stages, (ii) the charge-pump circuit pump cell select input couples to the pump cell select input of the plurality of charge-pump stages, (iii) the charge-pump circuit voltage input couples to the stage voltage input of a first charge-pump stage of the plurality of charge-pump stages, and (iv) the charge-pump circuit voltage output couples to the stage voltage output of a second charge-pump stage of the plurality of charge-pump stages.

4. The device of claim 3, wherein the first charge-pump stage and the second charge-pump stage comprise a same charge-pump stage of the plurality of charge-pump stages.

5. The device of claim 3, where the first charge-pump stage and the second charge-pump stage comprise different charge-pump stages of the plurality of charge-pump stages.

6. The device of claim 3, wherein the charge-pump controller further includes a clock input, a reference voltage input, a charge-pump circuit output voltage comparator input, and a pump cell select output, wherein the charge-pump controller provides a pump cell select on the pump cell select output, the pump cell select being configured to selectively control the weighted capacitor array of pump cells of the at least one of the plurality of charge-pump stages of the charge-pump circuit.

7. The device of claim 6, further wherein the pump cell select selectively controls the weighted capacitor array of pump cells of the at least one of the charge-pump stages of the charge-pump circuit in response to
   (i) a comparison of (a) the reference voltage on the reference voltage input and (b) the charge-pump circuit output voltage on the charge-pump output voltage comparator input, and
   (ii) a clock signal on (a) the charge-pump circuit clock input and (b) the charge-pump controller clock input.

8. The device of claim 7, wherein the charge-pump controller further comprises:
   a comparator, the comparator having (i) a first comparator input coupled to the charge-pump controller reference voltage input, (ii) a second comparator input coupled to the charge-pump circuit output voltage, and (iii) a comparator output, wherein the comparator output changes its state in response to a comparison of the charge-pump circuit output voltage with the reference voltage indicating a transition of the charge-pump circuit output voltage above or below the reference voltage,
   a differentiator coupled to the comparator output, wherein the differentiator is configured to monitor the comparator output and produce a reset pulse each time the comparator output changes its state,
   a decimator coupled to the differentiator, wherein the decimator resets its count in response to the differentiator reset pulse, the decimator having a predetermined decimation count and configured for counting a number of clock periods that occur in response to not being reset by the differentiator, the decimator further providing an rising edge output signal in response to each occurrence of counting up to a multiple of the predetermined decimation count,
   an up/down counter having an counter input, an up/down control input, a parallel load control input, a parallel data input, and a counter output, wherein the up/down control input is coupled to the comparator output for controlling the up/down counter to count up or down in response to the state of the comparator output, and wherein the up/down counter outputs the pump cell select output of the charge-pump controller as a function of (i) the rising edge output signal of the decimator on the counter input and (ii) comparator output on the up/down control input,
   a counter enable switch coupled between the decimator output and the counter input, the counter enable switch having a switch control input, wherein the counter enable switch operatively couples the decimator output to the up/down counter input in response to an enable signal on the switch control input,
   a latch having an input and an output, wherein the latch input is coupled to the comparator output, and wherein the latch output is coupled to the switch control input of the counter enable switch and to the parallel load input of the up/down counter, and
   a memory coupled to the parallel data input of the up/down counter, the memory configured for providing predetermined data on the parallel data input, wherein responsive to an initial activation or reset of the charge-pump circuit, the latch output disables the counter enable switch and activates the parallel load input, wherein the up/down counter outputs the pump cell select output as a function of the predetermined data received on the parallel data input instead of as a function of the decimator output.

9. The device of claim 1, wherein the charge-pump circuit includes a first pump cell select input, a first charge-pump circuit output voltage, a second pump cell select input, and a second charge-pump circuit output voltage, and
   wherein the charge-pump controller includes a first charge-pump controller and a second charge-pump controller, the first and second charge-pump controllers being coupled to the charge-pump circuit, the first charge-pump controller configured to provide a first pump cell select in response to the first charge-pump circuit output voltage and a first reference voltage, and the second charge-pump controller configured to provide a second pump cell select in response to the second charge-pump circuit output voltage and a second reference voltage.

10. The device of claim 1, wherein the selective control of the weighted capacitor array of pump cells of the charge-pump stages varies a capacitance of the respective charge-pump stages to thereby change a source impedance condition of the charge-pump circuit voltage output.

11. The device of claim 1, wherein the output voltage signal remains constant within a predetermined amount of ripple in presence of a dynamically changing load coupled to the charge-pump circuit voltage output.

12. The device of claim 1, wherein the plurality of charge-pump stages comprises a single charge-pump stage.

13. The device of claim 1, wherein at least one of the plurality of charge-pump stages comprise five charge-pump cells coupled in parallel, wherein a first charge-pump cell includes a single capacitor, a second charge-pump cell includes a single capacitor, a third charge-pump cell includes two capacitors coupled in parallel, a fourth charge-pump cell includes four capacitors coupled in parallel, and a fifth charge-pump cell includes eight capacitors coupled in parallel, further wherein the first charge-pump cell comprises a clocked and non-selectable charge-pump cell and wherein the second, third, fourth, and fifth charge-pump cells comprise clocked and selectable charge-pump cells.

14. The device of claim 13, wherein an impedance of a charge-pump stage is a maximum in response to a clocking of the first charge-pump cell and a non-selection of the second, third, fourth, and fifth charge-pump cells.

15. The device of claim 13, wherein an impedance of the charge-pump stage is a minimum in response to a clocking of the first charge-pump cell, and a clocking and selection of second, third, fourth, and fifth charge-pump cells.

16. The device of claim 1, wherein the charge-pump controller comprises:
   means for sensing transition changes in a comparison of the charge-pump circuit voltage output and a reference voltage,
   means for counting a number of clock periods occurring after each sensed transition, and
   means for incrementing or decrementing the source impedance of the charge-pump circuit, as a function of the counted number of clock periods occurring after each sensed transition, by selectively clocking the weighted capacitor array of pump cells of the charge-pump stages to decrease or increase, respectively, a corresponding capacitance of the respective charge-pump stages.

17. The device of claim 1, wherein the weighted capacitor array of pump cells comprises a binary weighted capacitor array of pump cells.

18. A charge-based voltage multiplier device, comprising:
   a charge-pump circuit configured to multiply an input voltage signal into an output voltage signal, the charge-pump circuit including a plurality of charge-pump stages, wherein at least one of the charge-pump stages includes a weighted capacitor array of pump cells, wherein the weighted capacitor array of pump cells comprises a binary weighted capacitor array of pump cells; and
   a charge-pump controller configured to provide a pump cell select to selectively control the weighted capacitor array of pump cells of the at least one of the charge-pump stages of the charge-pump circuit, wherein the charge-pump controller comprises,
      means for sensing transition changes in a comparison of the charge-pump circuit voltage output and a reference voltage,
      means for counting a number of clock periods occurring after each sensed transition, and
      means for incrementing or decrementing the source impedance of the charge-pump circuit, as a function of the counted number of clock periods occurring after each sensed transition, by selectively clocking the weighted capacitor array of pump cells of the charge-pump stages to decrease or increase, respectively, a corresponding capacitance of the respective charge-pump stages.

* * * * *